United States Patent [19]
Scott et al.

[11] Patent Number: 6,101,473
[45] Date of Patent: *Aug. 8, 2000

[54] USING SPEECH RECOGNITION TO ACCESS THE INTERNET, INCLUDING ACCESS VIA A TELEPHONE

[75] Inventors: Brian L. Scott; Clint L. Miller, both of Denton, Tex.

[73] Assignee: Board of Trustees, Leland Stanford Jr., University

[ * ] Notice: This patent issued on a continued prosecution application filed under 37 CFR 1.53(d), and is subject to the twenty year patent term provisions of 35 U.S.C. 154(a)(2).

[21] Appl. No.: 08/907,628

[22] Filed: Aug. 8, 1997

[51] Int. Cl.[7] .................................................. G10L 15/00
[52] U.S. Cl. ............................................................ 704/275
[58] Field of Search ..................................... 704/270, 275, 704/243; 345/302; 358/402; 455/445; 379/90.01, 88.13; 370/352; 709/201–204

[56] References Cited

U.S. PATENT DOCUMENTS

| | | | |
|---|---|---|---|
| 5,544,320 | 8/1996 | Konrad | 395/200.33 |
| 5,737,395 | 4/1998 | Irribarren | 379/88.13 |
| 5,742,905 | 4/1998 | Pepe et al. | 455/445 |
| 5,748,186 | 5/1998 | Raman | 345/302 |
| 5,805,298 | 9/1998 | Ho et al. | 358/402 |
| 5,819,220 | 10/1998 | Sarukkai et al. | 704/243 |
| 5,838,682 | 11/1998 | DeKelbaum et al. | 379/90.01 |
| 5,867,495 | 2/1999 | Elliott et al. | 379/90.01 |
| 5,916,302 | 6/1999 | Dunn et al. | 709/204 |
| 5,923,736 | 7/1999 | Shachar | 379/90.01 |

FOREIGN PATENT DOCUMENTS 0 854 418 A2  7/1998  European Pat. Off. .......... G06F 3/16

OTHER PUBLICATIONS

Harry Newton, Newton's Telecom Dictionary, 10th Edition, 1996, Flatiron Publishing, Inc., pp. 616–621.

*Primary Examiner*—David D. Knepper
*Attorney, Agent, or Firm*—Coudert Brothers

[57] ABSTRACT

Voice activation of functions on a network such as the Internet are accomplished using a speech recognition system running synchronously with standard desktop-based Internet functions. This synchronous operation allows voice-based control to be exercised for all operations on the Internet. System functions are based on a unique combination of a local web browser, a remotely-located speech/web server, and control links between a web browser and a speech/web server. The control links provide a mechanism for controlling a speech server from a web page and a mechanism for driving both the local, as well as a remote, web browser.

19 Claims, 7 Drawing Sheets

USING SPEECH RECOGNITION TO ACCESS THE INTERNET, INCLUDING ACCESS VIA A TELEPHONE

TITLE OF THE INVENTION

Method and System for Using Speech Recognition to Access the Internet, including Access Via a Telephone.

FIELD OF THE INVENTION

The present invention relates to the field of computerized communication on the Internet. The general purpose of this invention is to enable speech access to the Internet over standard telephone lines and Internet control of telephony functions through standard web pages. This is accomplished through a unique combination of speech server, web browser, and control links. The control links provide a mechanism for controlling the speech server from a web page and a mechanism for driving both the local, as well as a remote, web browser.

BACKGROUND OF THE INVENTION

The Internet is essentially a network of servers containing information that users can obtain using personal computers. Users generally connect to a server, a computer equipped with information and capabilities that assist the user with contacting other servers and obtaining additional information. Users typically execute these functions, also referred to as "navigating" on the Internet, using a mouse and Windows-based software. The user's navigation of the Internet is thus essentially graphically-based (looking at a screen) with functions activated using a mouse.

Speech recognition software and hardware for use in conjunction with personal computers and other environments, like the Internet, is a rapidly developing technology. With speech recognition, a user's voice commands are recognized by a computer and then converted, based on the speech pattern, into an electronic signal. For example, speech recognition has been highly successful in the field of long-distance telephone calling for the purpose of allowing collect calls. Typically, with this application, a caller will provide a name and a phone number to a computer when making a collect call. The computer will then place the caller on hold and call the number to be reached. The person receiving the collect call will answer "yes" or "no" in response to the computer message and the collect caller's name. The voice recognition hardware and software, which is also known as a speech recognition engine, either signals a switch to complete the call upon recognizing the "yes" response, or to disconnect upon recognizing the "no" response.

One issue with using speech recognition is selecting the appropriate speech recognition engine to use for a particular application. These speech recognition engines include speaker dependent and independent dictation machines, continuous speech systems, large vocabulary systems, and small vocabulary systems. Further, these systems can be Windows based, Macintosh based, UNIX based, Windows NT based, or based on another platform, depending on the preferred operating system.

Speech recognition operating in conjunction with computer connection with the Internet, also known as speech enabling of the Internet, appears to have promising application possibilities. One possible application of this technology is for navigational purposes on the Internet. For example, speech recognition has been successfully utilized at the desktop level generally. Voice macros have been created for a number of Windows functions for use on the Internet. A macro is a series of functions on the computer activated by a single command. For a voice macro, the speech server's recognition of an inputted voice command activates a series of commands.

Two prior art methods for speech-enabling the Internet have been explored by various companies and research entities. In general terms, researchers have approached the problem from either the perspective of speech-enabling the Internet, or from the perspective of Internet-enabling the telephone system.

The first method is the most common approach and the one being pursued by Texas Instruments, Apple Computer, and Microsoft. In this approach, the speech recognition engine is located on the local host, along with the web browser. This approach allows such activities as those described above—voice macros for Windows functions that can be used when browsing the Internet.

Texas Instruments further refined this approach by using the text associated with hotlinks to supply the vocabularies for the recognizer. Apple has taken the approach of making both the web browser and the speech recognition engine scriptable (controllable with the AppleScript language). Microsoft has taken the approach of providing tools for web page developers to allow them to speech-enable their web pages. These tools provide a mechanism for supplying the recognizer with grammars and their speech synthesizers with spoken prompts.

The advantages of the present invention over this method include: (1) telephone access serves a far greater potential audience than speech access limited to desktop operations; (2) no additional requirements of the user's computer, such as a speech recognition engine, are required; (3) the system uses a migration path starting with an immediate utility with no long-term limitations; and (4) direct benefits are available from telephony integration.

Internet-enabling the telephone system is primarily being investigated as a research effort. Demonstrations from MIT and the Sun SpeechActs group have shown potential for using a speech-only interface for retrieving personal information (voice e-mail) over the phone and for using the Internet as an up-to-date repository of information available over the phone. For example, ALTech, a commercial spin-off of MIT, has demonstrated the use of a speech server for obtaining information about local movies.

Advantages of the present invention over this method include: (1) an optional Graphical User Interface (GUI) makes using the system with today's World Wide Web much more practical and simple than attempting to do it with speech alone; (2) the potential user base is just as large over the long term; and (3) providing tools to other developers is expected to lead to much more rapid progress than attempting to build speech-only interfaces from the ground up.

SUMMARY OF THE INVENTION

This invention links networks such as the Internet and the World Wide Web to a speech recognition server, which resides on the telephone system, to provide for speech access to these networks over standard telephone lines and control of telephony functions through standard web pages. These capabilities are accomplished through a combination of speech server (typical of those found in Interactive Voice Response (IVR) applications), web browser, and control links. The control links consist of software that provides a mechanism for controlling the speech server from a web page, and a mechanism for driving both the local, as well as a remote, web browser.

An example of the capabilities of the system is as follows. A user seeking a service to provide stock quotes can access these quotes by graphically browsing the Internet to a web page that continually carries the quotes. Once at the web page, the user can activate the present invention, telling the speech server to, for example, "mark this" or "show me the stock quote". The server can then be set to either tell the user the stock price or go to that web page upon recognizing of the selected speech pattern.

The general purpose of this invention is thus to provide a method for linking a remote speech recognition device operating over the telephone network to any web browser operating over the Internet. This link enables the user's web browser to be controlled by the remote speech recognition device, and, in turn, enables telephony functions to be controlled by any web browser. In addition to providing an immediate solution to accessing the web by voice, the invention provides tools and motivation for web page authors to generate web pages that are tailored to speech-only interfaces. This is expected to transform the nature of the web, and, over time, to support a truly multi-modal interface with the Internet.

The significance of the invention is that it provides both a means for immediately speech-enabling the Internet and a means for gradually Internet-enabling the telephone system. Other systems have approached the problem of linking speech technology and the Internet from either one perspective or the other (that is, speech-enabling the net or net-enabling the telephone). The approach of the present invention, however, can be viewed from either perspective, and, in so doing, leads to an immediate speech-enabling of the Internet, and to a process of Internet-enabling the telephone. In addition, the present invention leads to functionality completely unobtainable from either of the other approaches taken alone.

The control of both the server's web browser and the user's remote web browser also enables an optional GUI for the user of the Speech/web server. The GUI link is not required for the system to operate; however, because the web is currently graphically-oriented, the ability to use the local web browser as a GUI for the speech-driven browser is expected to be beneficial when surfing the web by voice. The concept of a telephony-based web browser with an optional GUI constitutes a significant attribute of the system because it provides a common platform that can be used for simple applications by anyone with a telephone. In addition, it can be used for more difficult tasks when a PC or workstation is available to the user.

Another example of the use of the present invention pertains to speech input and output over telephone lines as the additional modality that can be linked to the conventional web browser interface. Thus, rather than placing a call, hanging up, and placing another call, a user will be able to browse using the telephone. This browsing includes such activities as seamlessly speaking to one person, and then connecting to another, and then checking messages and ordering a pizza, all without hanging up and without ever dialing a number. The same method links any alternative user interface to the user's standard web browser. This pertains to browsers with teletypewriter (TTY) interfaces, browsers that understand and speak other languages, or even browsers capable of providing a sense of smell, sight, taste, and touch.

Additional objects, advantages and novel features of the invention will be set forth in part in the description which follows, and in part will become more apparent to those skilled in the art upon examination of the following or may be learned by practice of the invention. The objects and advantages of the invention may be realized and attained by means of the instrumentalities and combinations particularly pointed out in the appended claims.

To achieve the stated and other objects of the present invention, as embodied and described below, the invention may comprise the steps of:

accessing a voice recognition server through a voice transmission device;

such device translating voice transmissions into electronic signals; and using said translated voice transmissions to perform functions on the Internet via voice translation being performed by said server.

BRIEF DESCRIPTION OF THE DRAWINGS

A block diagram of the invention is shown in FIG. 1.

DETAILED DESCRIPTION OF THE PREFERRED EMBODIMENT

Using the drawings, the preferred embodiment of the present invention will now be explained.

Figure 1:
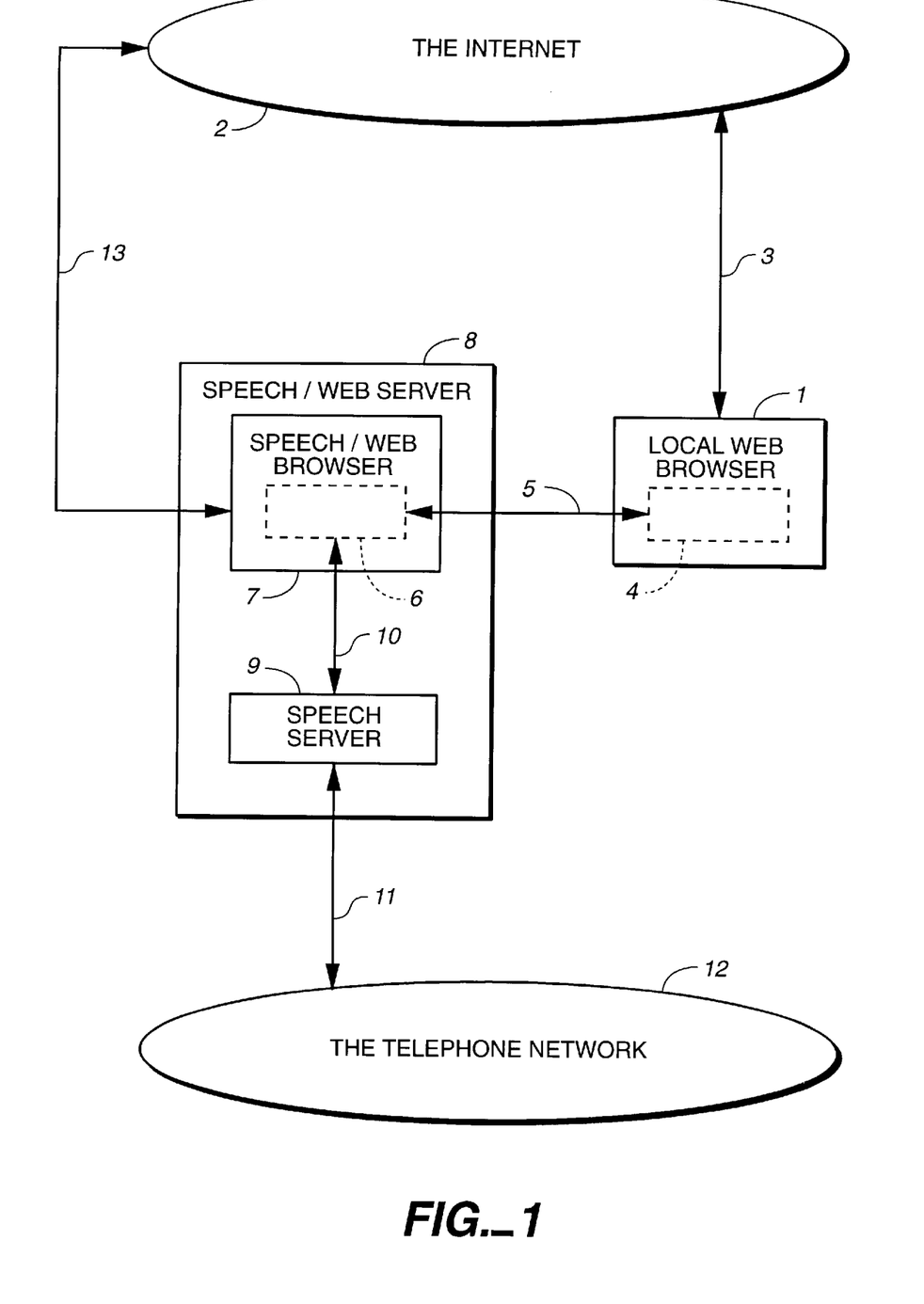

A block diagram of the invention is shown in FIG. 1. A local web browser 1, such as Netscape on a PC, is used to browse the Internet 2 using a conventional Transport Control Protocol (TCP) link 3. The local web browser 1 contains an Applied Speech Technology Protocol (ASTP) plugin 4, which communicates by ASTP link 5 with an ASTP controller 6 located within a speech/web browser 7 of a speech/web server 8, such as a Pentium processor-based PC running Windows NT. This PC also hosts, or a separate PC coupled to the speech/web server 8 hosts, the speech server 9, which is coupled 10 to the ASTP controller 6. These couples can consist of such connections as an electronic circuit, a fiber optic line, an electromagnetic signal, or any other means of coupling known in the art. A Dialogic line card located in the backplane of the speech server 9 PC couples 11 the speech server to a telephone network 12. The speech/web browser 7 is also TCP linked 13 to the Internet 2.

The three major components of the speech/web server thus are the speech/web browser 7, the speech server 9 with telephony functions, and the ASTP controller software 4 and 6.

The speech/web browser 7 is a standard, off-the-shelf web browser with an ASTP plug-in 6. The ASTP plug-in 6, as described below, is a software program written in a language, such as JAVA, that allows the program to run within a web browser, such as Netscape. However, since the speech/web browser 7 is driven by speech-only, it is always run in text-only mode. This gives it a considerable response time advantage over a browser that must download and display graphics. The time normally devoted to graphics can thus be used by the recognizer (speech server 4) to compile the grammar for the new web page.

The speech server 9 is typical of those used for IVR and operator assist applications. These systems vary considerably in the number of simultaneous channels of speech recognition they can support, but are most often built from off-the-shelf components that plug into a PC (AT bus). A typical configuration for a speech server would be a Pentium class PC running UNIX or Windows NT, loaded with a speech recognizer such as ALTech, PureSpeech, or Nuance, with a Dialogic line card capable of handling multiple simultaneous telephone lines, and two speech recognition boards, each with four channels of recognition. Speech output is either from pre-recorded prompts or a speech synthesizer. The telephone line card enables the system to dial out, receive calls, and to conference calls.

The ASTP software 4 and 6 is the heart of the system. As noted, this software is written and distributed as a plug-in module to Netscape or other browsers and is written in a typical software that can operate in Netscape, such as JAVA. The protocol is a superset of the Common Client Interface (CCI), which provides the mechanism for establishing a persistent link between the speech/web browser 7 and the user's browser (local web browser 1). The persistent link enables the speech/web browser 7 to remotely control the user's web browser 1, the user's web browser 1 to control the speech/web browser 7, and also allows the two browsers 1 and 7 to traverse the web in tandem.

In addition to the CCI-like capability, the ASTP protocols provide the interface to the speech server 9, telling the recognizer what grammar to compile for the next web page. This function is typically fulfilled by simply stripping the text associated with each hotlink and sending it to the recognizer's grammar compiler. Alternatively, versions of the protocol support calls to high-level routines, called "speech behaviors", that handle all of the dialog between the user and the machine. These high-level routines allow users to supply, by voice, specific kinds of information when using the Internet, such as credit card numbers, addresses, and telephone numbers. By providing web page authors with access to well-designed dialog modules that can be easily deployed through simple-to-use web authoring tools, such as the ASTP protocols, the predominately graphical nature of the web changes to accommodate a speech-only, telephone-based interface.

Finally, the ASTP link 5 is what provides the conduit between the web page and the telephone. This allows web authors to include telephone numbers associated with hotlinks that can be dialed by the speech/web server 8. This capability may change how switching is currently done in the telephone network 12.

Figure 2:
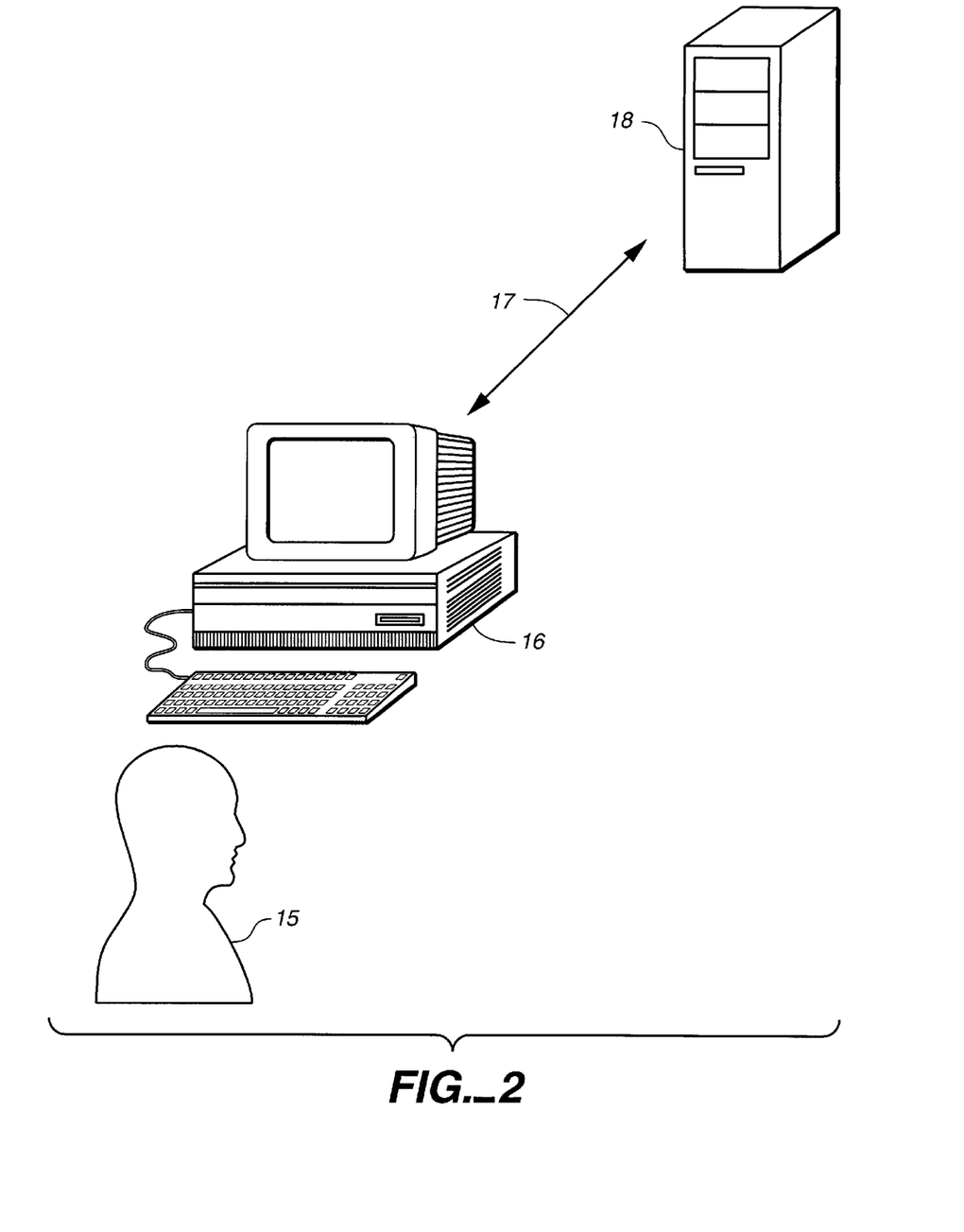
FIG. 2 shows how a user that happens across the web page containing connection information on the present invention initiates the process of speech enabling his or her web browser using the preferred embodiment.

FIG. 2 shows how a user that happens across the web page containing connection information on the present invention initiates the process of speech enabling his or her web browser using the preferred embodiment. A user 15 using a local web browser 16 initiates a TCP connection 17 with the speech/web site, which is served by the speech/web server 18, by selecting a hotlink such as "surf the web by voice" at the web site.

Figure 3:
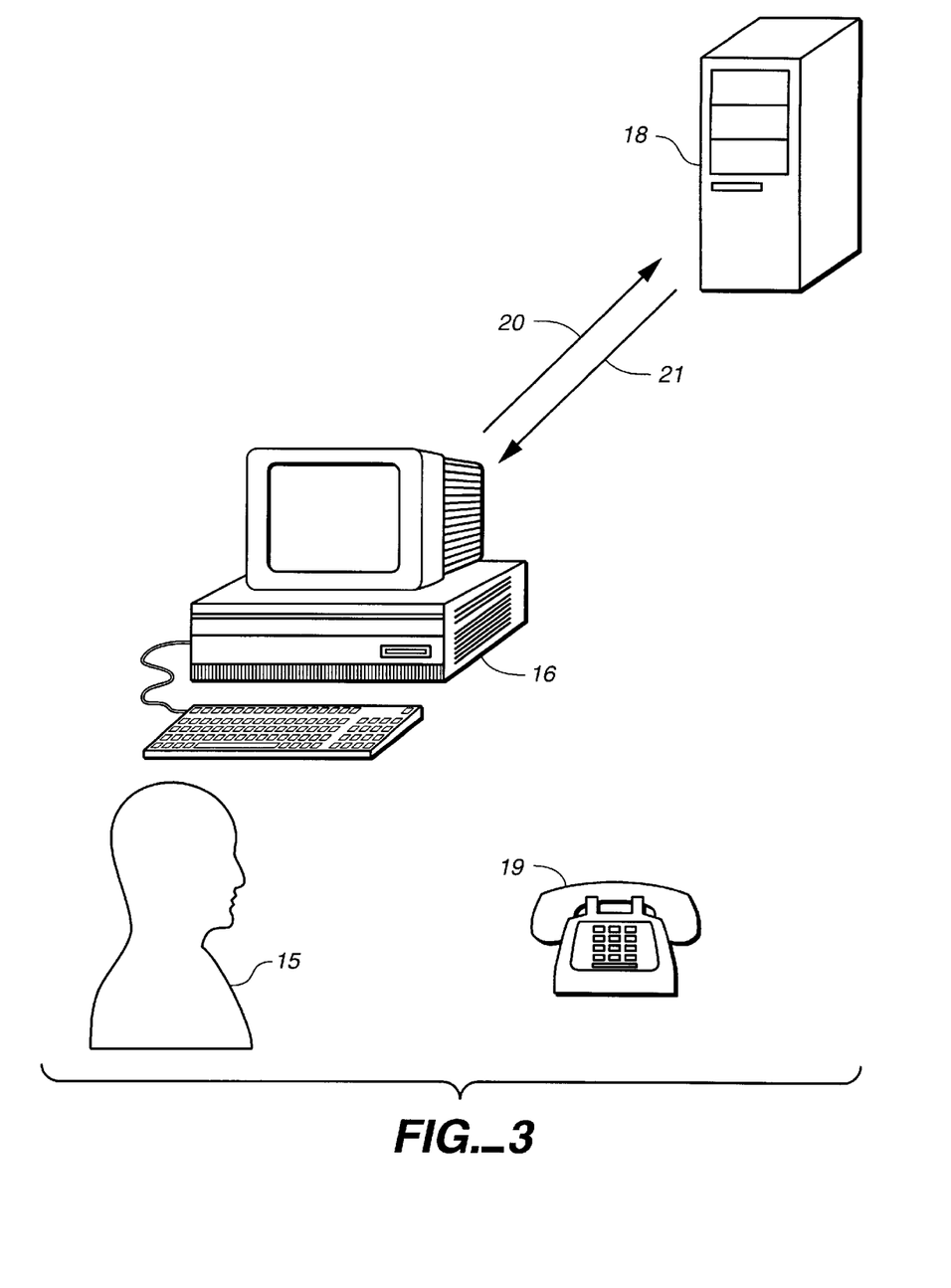
FIG. 3 illustrates the exchange of information necessary to speech enable a web browser.
Figure 4:
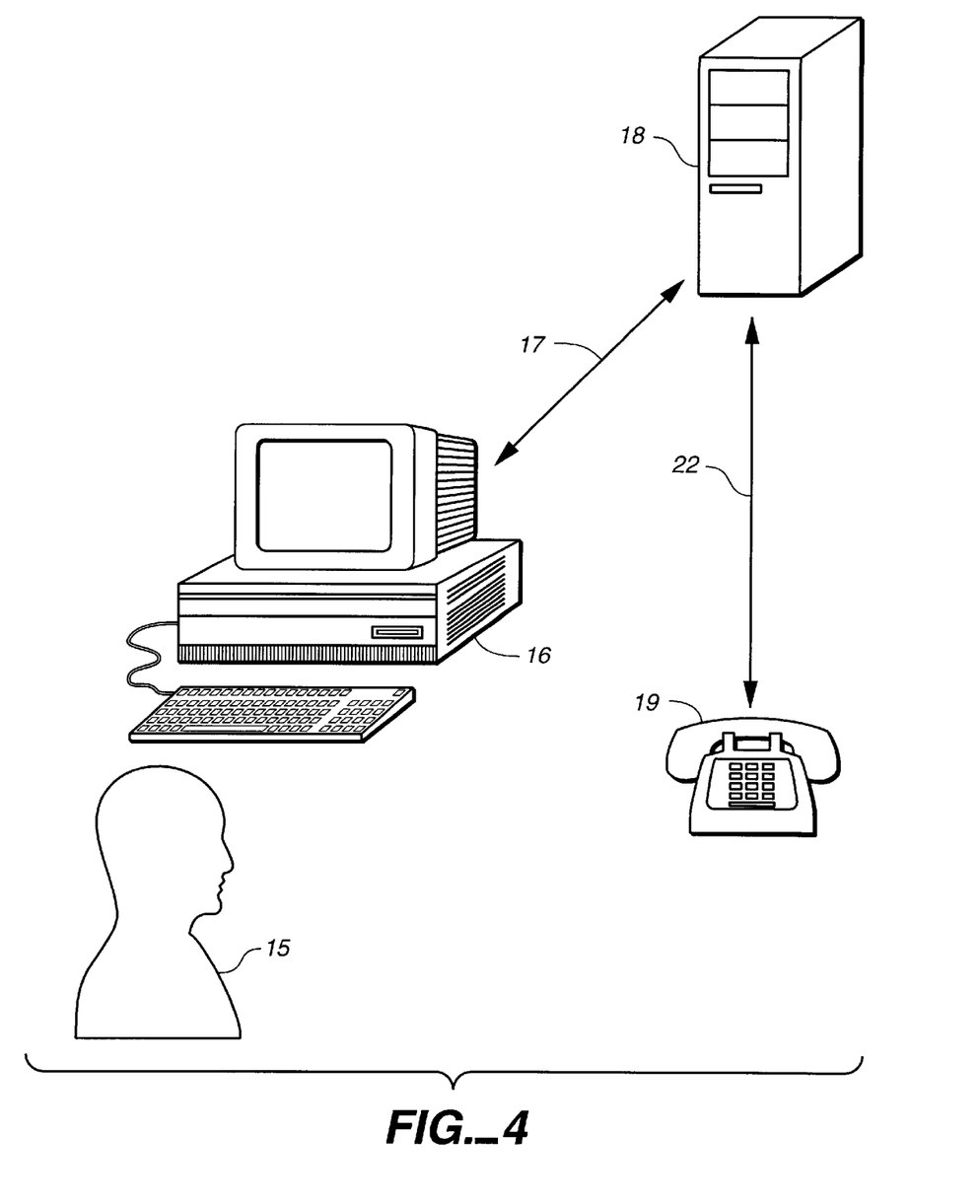
FIG. 4 shows the connections in place for operation of the preferred embodiment.

In FIG. 3, user 15 of a local web browser 16 and local telephone 19 uploads 20 to the speech/web server 18 from the local web browser 16 the local telephone number and downloads 21 the ASTP plug-in from the speech/web server 18. In FIG. 4, the user 15 of the local web browser 16 and local telephone 19 simultaneously connects by ASTP connection 17 and by telephone connection 22 with the speech/web server 18.

Figure 5:
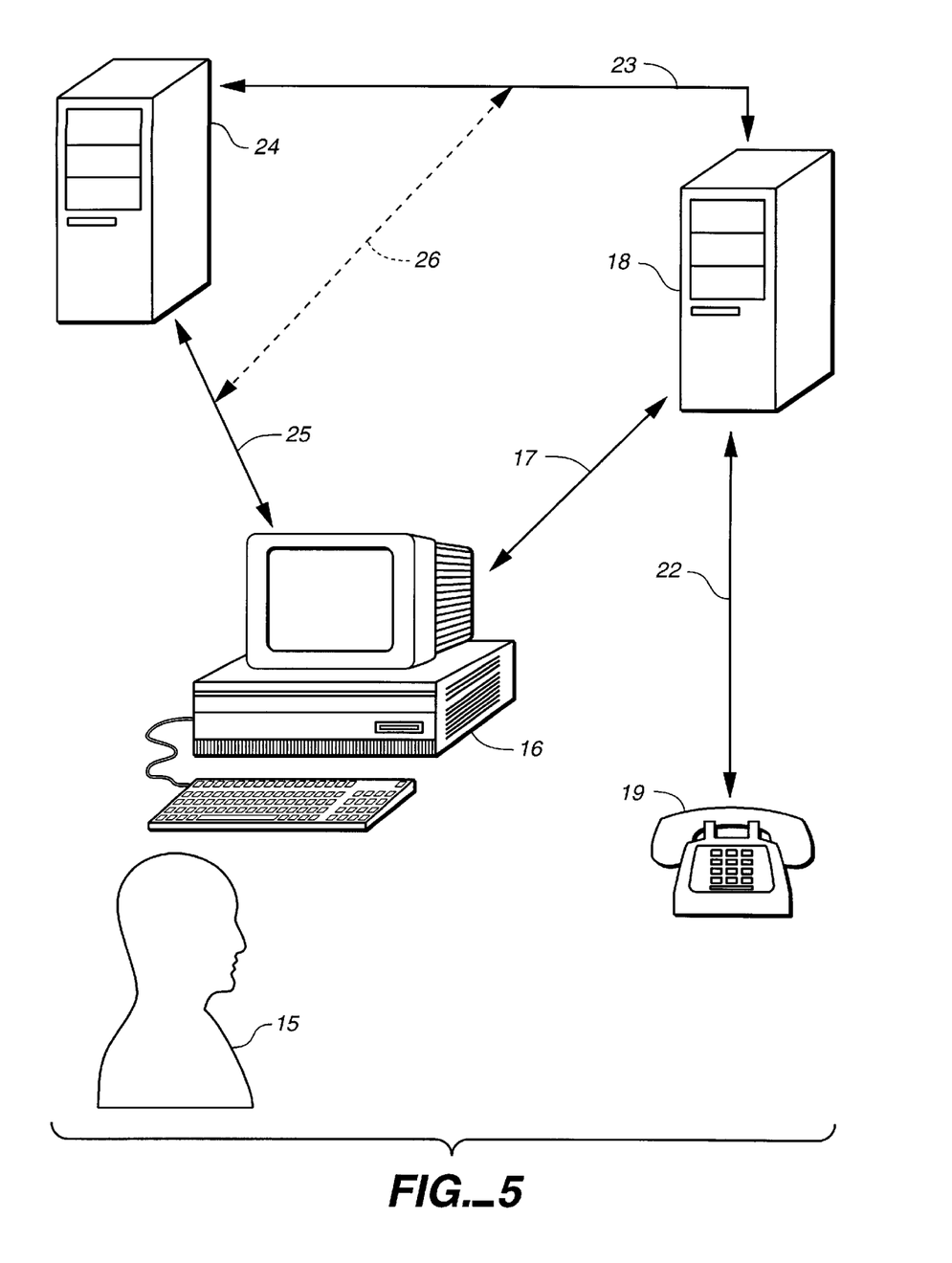
FIG. 5 illustrates all of the components of the system in operation.

The setup of the preferred embodiment is now completed, as shown in FIG. 5. The user 15 of the local web browser 16 and local telephone 19 simultaneously communicates with the speech/web server 18 via ASTP connection 17 and telephone connection 22. The user 15 is also connected by a TCP link 25 to other web servers 24 simultaneously 26 with the speech/web server 18 connection by a TCP link 23 with those other web servers 24.

As a result of these simultaneous links 26, the user can browse the Internet using voice while looking at the screen of the local web browser 16 and speaking over the phone 19. Typically these links allow a user to speak into the phone using words within the system's capability. These words are recognized and interpreted by the speech/web browser located at the speech/web server 18 and translated into a TCP link 23 command for the speech/web browser at the speech/web server 18. At the same time, the ASTP supplies the same TCP link command 17 on the local web browser 16. Thus, the user 15 speaks to control browsing of the Internet.

A significant advantage of the preferred embodiment is responsiveness. The dual link approach allows time for the speech/web server to generate grammars while the user's browser is busy displaying graphics. A secondary advantage is that neither of the web browsers need to be modified for the system to work.

Variation and Modifications

Figure 6:
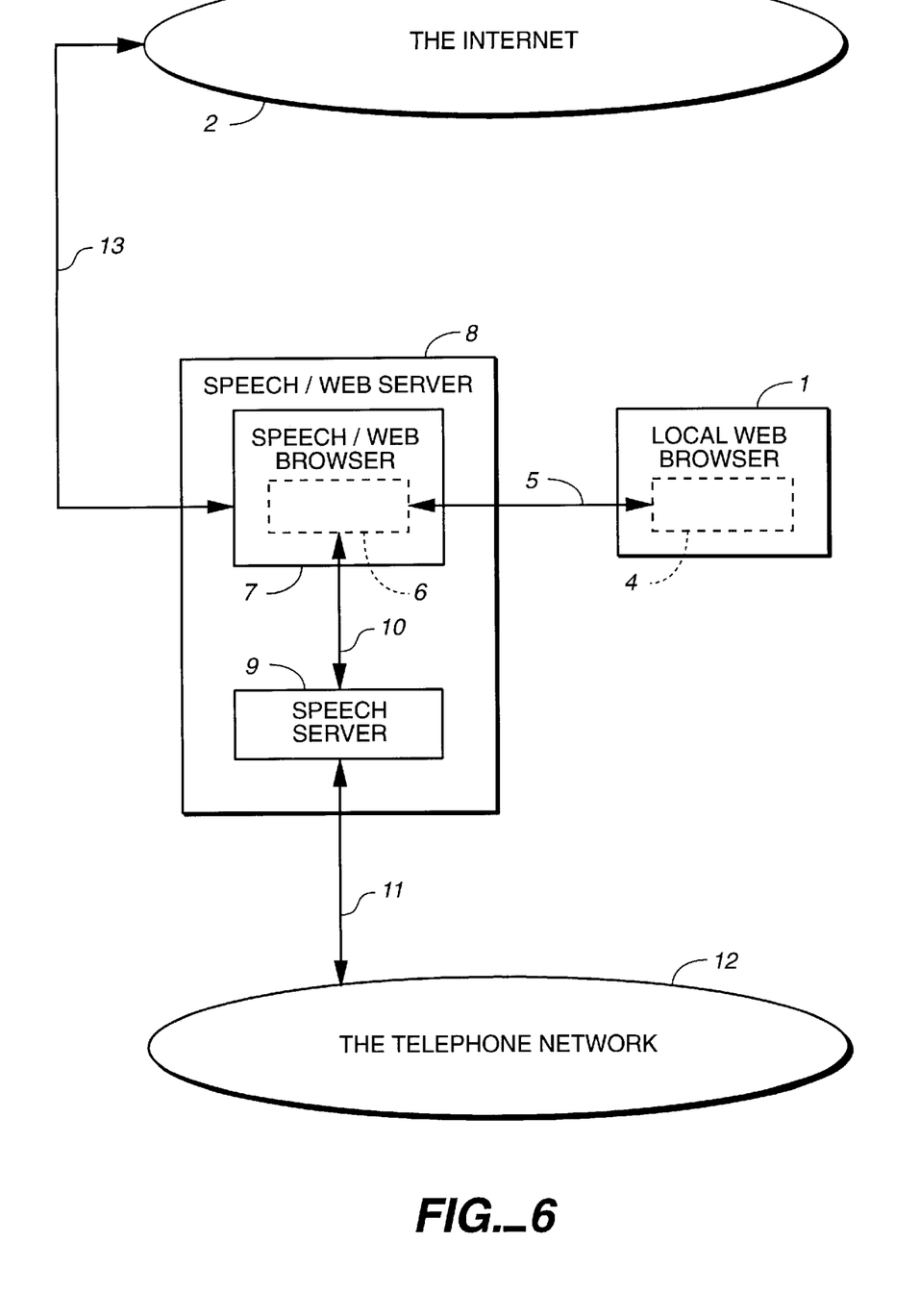
FIG. 6 Contains an alternative embodiment, in which the local web browser is a slave to the speech/web server.
Figure 7:
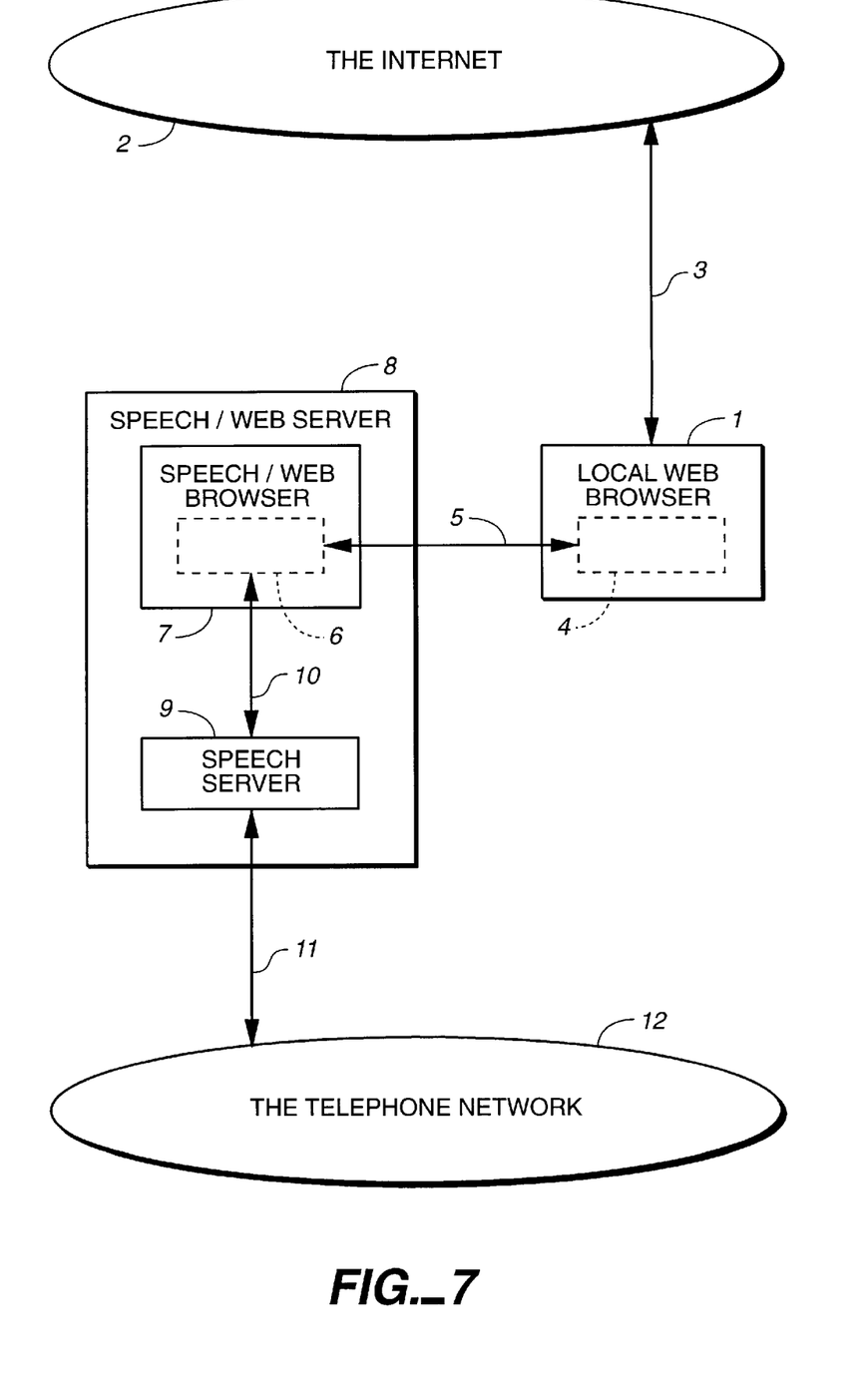
FIG. 7 contains a second alternative embodiment, in which the speech/web server is a slave to the local web browser.

Two variations on the invention are illustrated in FIGS. 6 and 7. These approaches differ from the one described in FIG. 1 in that they require only a single link into the Internet, rather than the two links described previously.

In the method shown in FIG. 6, the local web browser 1 with ASTP plug-in 4 is linked 5 to an ASTP controller 6 located within a speech/web browser 7 housed within a Pentium processor PC-based speech/web server 8. This PC is typically running Windows. This PC also hosts, or a separate PC coupled to the speech/web server 8 hosts, the speech server 9, which is coupled 10 to the ASTP controller 6. The speech server 9 is linked 11 to a telephone network 12. The speech/web browser 7 is also TCP linked 13 to the Internet 2.

The primary difference between this alternative and the earlier embodiment (FIG. 1) is that a direct link 13 does not exist between the speech/web browser 6 and the Internet 2 simultaneous with a link between the local web browser 1 and the Internet 2 (link 3 of FIG. 1).

In the method shown in FIG. 7, the local web browser 1 with ASTP plug-in 4 is linked 5 to an ASTP controller 6 located within a speech/web browser 7 housed within a Pentium processor-based PC speech/web server 8. This PC also hosts, or a separate PC coupled to the speech/web server 8 hosts, the speech server 9, which is coupled 10 to the ASTP controller 6. The speech server 9 is linked 11 to a telephone network 12. The local web browser 1 is also TCP linked 3 to the Internet 2.

The primary difference between this alternative and the earlier embodiment (FIG. 1) is that a direct link does not exist between the speech/web browser 6 and the Internet 2 (link 13 of FIG. 1) simultaneous with a link 3 between the local web browser 1 and the Internet 2.

What is claimed is:

1. A remote server to enable a local user to increase the functionality of a local browser having a graphical user interface, comprising:

a remote web browser residing on the remote server;

a speech controller electronically coupled to said remote web browser, said controller being configured to form control links coupling the local browser to said remote browser via an Internet data communication link to enable said remote web browser and the local browser to function cooperatively; and a speech server having a speech recognition function residing on the remote server, said speech server coupling said controller to a telephone network so that a telephonic voice communication link may be established between the user and said controller;

wherein voice commands to control browsing may be input via said telephonic voice communication link and wherein graphical user interface commands to control browsing may also be input via the local browser.

2. The server of claim 1, wherein said controller and said server are configured to form said telephonic voice communication link in response to the user accessing a web site via said Internet data communication link.

3. The server of claim 1 wherein said control links are configured to enable the local browser to control the telephonic function of said speech server.

4. The server of claim 1, wherein said controller is a software module contained in said remote browser.

5. The server of claim 4, wherein said controller is configured to download a software program to the local browser to form persistent control links.

6. A remote server to enable a local user to increase the functionality of a local browser, comprising:

a remote web browser residing on the remote server;

a speech controller electronically coupled to said remote web browser, said controller being configured to form control links coupling the local browser to said remote browser via an Internet data communication link to enable said remote web browser and the local browser to function cooperatively; and a speech server having a speech recognition function residing on the remote server, said speech server coupling said controller to a telephone network so that a voice communication link may be established between the user and said controller;

wherein said control links are configured to enable voice commands to be uploaded to control the browsing function while information from the Internet is downloaded to a graphical user interface of the local browser.

7. The server of claim 6, wherein said control links are configured so that the user may browse by both voice commands and by inputting commands via said graphical user interface.

8. A network system, comprising:

a) a local browser disposed on a local computer; and b) a remote server including:

i) a remote browser residing on said remote server;

ii) a speech controller software module electronically coupled to said remote browser; and iii) a speech server having a speech recognition function residing on the remote server, said speech server coupling said speech controller software module to a telephone network so that a voice communication link may be established between the user and said speech controller software module;

said controller software module having an interface protocol for remotely controlling web browsers configured to form control links coupling said local browser to said remote browser via a network data link to enable said remote web browser and said local browser to function cooperatively, wherein said control links are configured so that auxiliary voice commands may be input by the user to control browsing of the network.

9. The system of claim 8, wherein said local browser includes a graphical user interface and said control links are configured so that the user may browse by both voice commands and by inputting commands via said graphical user interface.

10. A network system, comprising:

a) a local browser disposed on a local computer; and b) a remote server including:

i) a remote browser residing on said remote server;

ii) a speech controller software module electronically coupled to said remote browser, said controller software module being configured to form control links coupling said local browser to said remote browser via a network data link to enable said remote web browser and said local browser to function cooperatively; and iii) a speech server having a speech recognition function residing on the remote server, said speech server coupling said speech controller software module to a telephone network so that a voice communication link may be established between the user and said speech controller software module;

wherein said control links are configured to enable voice commands to be uploaded to control the browsing function while information from the network is downloaded to the graphical user interface of said local browser.

11. The system of claim 10 wherein said controller software module includes an interface protocol for remotely controlling a web browser.

12. A method for permitting a local user to link a local web browser to a remote speech recognition device, comprising the steps of:

a) electronically coupling the local browser to a web-site served by a remote server;

b) downloading a software program from a remote web browser residing on said remote server to form control links between the local web browser and a controller coupled to said remote web browser; and c) telephoning the user to form a voice communication link between the user and said controller via a speech server coupling said controller to a telephone network;

whereby the user may input voice commands which are translated by said speech server to control browsing of a computer network while information from the network is downloaded to a graphical user interface of the local browser.

13. The method of claim 12, further comprising after step "b" the step of: uploading the phone number of the local user.

14. The method of claim 12, wherein said controller software module is contained in said remote web browser.

15. A method for permitting a local user to use voice commands to perform functions on a network, comprising the steps of:
- a) providing a remote server, the remote server having a controller for forming a first data communication link with a local user and a speech server for converting voice commands into control signals;
- b) accessing said remote server to form a first electronic communication link to a local browser;
- c) telephoning the user to form a voice transmission communication link coupling the user to the controller via said speech server;
- d) translating voice commands into electronic data signals using said speech server; and
- e) using said translated voice commands to perform functions on the network;

wherein said controller is configured to enable voice commands to be uploaded to control the browsing function while information from the network is downloaded to a graphical user interface of the local browser.

16. The method of claim 15, wherein the network comprises the Internet and further wherein the controller is contained in a remote browser residing on said remote server.

17. The method of claim 16, wherein said speech server is coupled to a telephone network and further comprising after step "b" the step of:

uploading a local telephone number.

18. The method of claim 15, further comprising the step of:

downloading a software program to said local browser to enable a persistent link to be formed between the controller and the local browser.

19. The method of claim 15, wherein said speech server is coupled to a telephone network and further comprising the step of:

accessing a hot-linked phone number on a web-site to initiate dialing of said phone number by said speech server.

* * * * *